No. 660,548. Patented Oct. 30, 1900.
F. ARLEDTER.
APPARATUS FOR MAKING ROSIN SOAP.
(Application filed July 22, 1899.)
(No Model.)
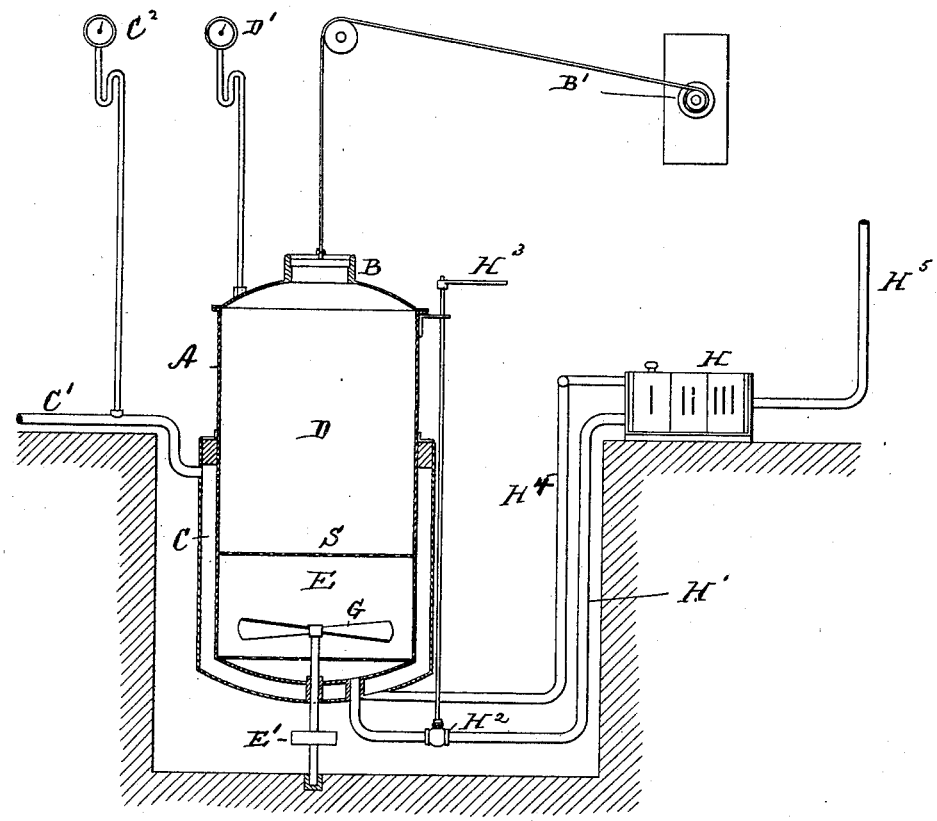
Witnesses:
John Becker.
John Hickman.
Inventor:
Fritz Arledter
by his attorneys
Roeder & Briesen

UNITED STATES PATENT OFFICE.

FRITZ ARLEDTER, OF BERLIN, GERMANY, ASSIGNOR TO LOUIS KEFERSTEIN, OF SAME PLACE, EDWARD JAMES SMITH, OF CHARLOTTENBURG, GERMANY, AND GEORG HUTH, OF LONDON, ENGLAND.

APPARATUS FOR MAKING ROSIN-SOAP.

SPECIFICATION forming part of Letters Patent No. 660,548, dated October 30, 1900.

Application filed July 22, 1899. Serial No. 724,782. (No model.)

*To all whom it may concern:*

Be it known that I, FRITZ ARLEDTER, a subject of the Emperor of Austria-Hungary, residing at Berlin, in the Kingdom of Prussia, Empire of Germany, have invented certain new and useful Improvements in Apparatus for the Manufacture of Rosin-Soap for Sizing Paper, of which the following is a specification.

In my German Patent No. 95,416, of December 4, 1896, I have described a process of manufacture of a size to be used more especially in paper-making and containing unsaponified rosin, said size being prepared by boiling rosin under pressure with an amount of alkali that is not high enough to produce complete saponification. Now the object of the present invention is an apparatus for the preparation, purification, and decoloration of this rosin-soap.

The apparatus is shown in the accompanying drawing in vertical longitudinal section.

A vertical cylindrical vessel A, fitted with a manhole or filling-opening having cover B, is surrounded in its middle and lower parts with a steam-jacket C for the purpose of heating the vessel, which is internally divided into two compartments by a sieve S. The cover B may be raised by means of a rope and hoist B'. The pipe C', which conducts steam to the jacket C, is provided with a gage $C^2$. The upper and larger compartment D, provided with gage D', is intended for the reception of the rosin, while the lower compartment E contains the soda-lye, in which the rosin melted by the rising vapor drops from the sieve and is boiled with the lye. The lower compartment E is fitted with vanes G, actuated by machinery for the purpose of stirring the mass. The boiled rosin-soap is, for the purpose of purifying and decoloring it, pressed in the filtering-sieve H, connected by a pipe H' with the space E. This filtering-sieve consists of a reservoir closed by a lid and containing several sieves, (felts,) between which a filtering material—such as coke, animal charcoal, asbestos, and the like—is placed. The filtering-sieve is, like the boiling vessel A, surrounded by a steam-jacket. The heating of vessel A can also be effected by direct firing.

Having thus described my invention, I declare that what I claim, and wish to protect by Letters Patent, is—

In an apparatus for the manufacture of rosin-soap, the combination of a vessel with an inclosed sieve that divides the vessel into an upper and lower compartment, a mechanical mixer beneath the sieve, means for heating the vessel, a filter, and a pipe that connects the filter with the lowermost compartment, substantially as specified.

In witness whereof I have hereunto signed my name in the presence of two subscribing witnesses.

FRITZ ARLEDTER.

Witnesses:
 HENRY HASPER,
 WOLDEMAR HAUPT.